United States Patent
Iwase et al.

(10) Patent No.: US 6,712,307 B2
(45) Date of Patent: Mar. 30, 2004

(54) WIRE WINDING APPARATUS AND METHOD FOR MANUFACTURING ARMATURE

(75) Inventors: Hideaki Iwase, Toyohashi (JP); Shinpachi Watanabe, Nukata-gun (JP); Satoru Yano, Toyohashi (JP); Eiji Katayama, Hamamatsu (JP); Hideo Suzuki, Kosai (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 10/287,595

(22) Filed: Nov. 5, 2002

(65) Prior Publication Data

US 2003/0089812 A1 May 15, 2003

(30) Foreign Application Priority Data

Nov. 13, 2001  (JP) ........................................ 2001-347598

(51) Int. Cl.[7] ............................................. H02K 15/09
(52) U.S. Cl. ........................ 242/433; 242/439.1; 29/596
(58) Field of Search .............................. 242/433, 433.1, 242/439.1, 439.2, 439.5; 29/596

(56) References Cited

U.S. PATENT DOCUMENTS

| | | | |
|---|---|---|---|
| 4,388,799 A | * | 6/1983 | Vives ...................... 242/439.5 |
| 5,484,114 A | * | 1/1996 | Santandrea et al. ...... 242/433.1 |
| 5,988,554 A | * | 11/1999 | Taka ........................ 242/433.1 |
| 6,325,319 B1 | * | 12/2001 | Noji .......................... 242/439.1 |
| 6,601,288 B2 | * | 8/2003 | Becherucci et al. ........... 29/596 |

FOREIGN PATENT DOCUMENTS

| | | | | |
|---|---|---|---|---|
| DE | 003412195 A1 | * | 10/1985 | ................. 242/433 |
| JP | 361227657 A | * | 10/1999 | .............. 242/439.2 |
| JP | A-2000-348959 | | 10/2000 | |

* cited by examiner

*Primary Examiner*—Emmanuel Marcelo
(74) *Attorney, Agent, or Firm*—Posz & Bethards, PLC

(57) ABSTRACT

A wire winding apparatus includes a wire nozzle unit, which is rotatable about a rotational axis of the wire nozzle unit, which is generally perpendicular to the axis of an armature core. The wire nozzle unit includes a plurality of wire nozzles, each of which receives and guides a corresponding one of the wires along each of two slots, which are arranged on opposite sides, respectively, of each of a plurality of salient poles of the armature core, to wind the wires around each salient pole. The wire winding apparatus further includes a nozzle rotating device, which rotates the wire nozzle unit about the rotational axis of the wire nozzle unit. The rotating device rotates the wire nozzle unit 180 degrees when the wire nozzle unit is moved from one of the two slots to the other of the two slots.

8 Claims, 7 Drawing Sheets

WIRE WINDING APPARATUS AND METHOD FOR MANUFACTURING ARMATURE

CROSS REFERENCE TO RELATED APPLICATION

This application is based on and incorporates herein by reference Japanese Patent Application No. 2001-347598 filed on Nov. 13, 2001.

BACKGROUND OF THE INVENTION

1. Field of the Invention

The present invention relates to improvements in a wire winding apparatus and a method for manufacturing an armature.

2. Description of Related Art

Generally, an armature for a dynamo electric machine has an armature core, which includes a plurality of salient poles, and wires are wound around the salient poles of the armature core.

A wire winding apparatus, which has wire nozzles for winding the wires around the salient poles, is known. Each wire nozzle of the wire winding apparatus is used to guide a corresponding wire, which extends from a corresponding wire bobbin, along each of two slots arranged on opposite sides, respectively, of each salient pole to wind the wire around the salient pole. The wire nozzles are slidable in a predetermined direction. The armature core can be rotated about its rotational axis synchronously with the slide movement of the wire nozzles.

FIG. 11 schematically shows a state where wire nozzles of a previously proposed wire winding apparatus are used to wind wires around one of salient poles of an armature. A first wire 281 and a second wire 282 are supplied and guided from a first wire nozzle 224 and a second wire nozzle 225, respectively. When a nozzle support 229, which supports the first and second nozzles 224, 225, is moved in the direction of the arrow in FIG. 11 around a salient pole 284, the first and second wires 281, 282 are wound around the salient pole 284.

However, when the first and second wires 281, 282 are wound around the salient pole 284, the first wire 281 and the second wire 282 could be twisted at a corner 284a of the salient pole 284. In FIG. 11, "A" indicates a twist where the first wire 281 and the second wire 282 are twisted to each other.

When such twisting occurs, it is not possible to wind the wires around the salient pole while maintaining proper alignment of the wires relative to each other. Thus, an occupancy rate of the wires on the salient pole is reduced, so that an output of a corresponding dynamo electric machine cannot be improved.

SUMMARY OF THE INVENTION

The present invention addresses the above disadvantages. Thus, it is an objective of the present invention to address the above-described disadvantages.

To achieve the objective of the present invention, there is provided a method for manufacturing an armature. In the method, a plurality of wires are simultaneously wound around each of a plurality of salient poles of an armature core using a wire nozzle unit, wherein the wire nozzle unit includes a plurality of wire nozzles, each of which receives and guides a corresponding one of the wires. During the winding of the wires, the wires, which are supplied from the wire nozzle unit, are placed between a first end and a second end of the armature core along a first one of two slots, which are arranged on opposite sides, respectively, of a corresponding one of the salient poles. Then, the wire nozzle unit is rotated 180 degrees about a rotational axis of the wire nozzle unit, which is generally perpendicular to the axis of the armature core. Thereafter, the wires, which are supplied from the wire nozzle unit, are placed between the second end and the first end of the armature core along a second one of the slots.

To achieve the objective of the present invention, there is also provided a wire winding apparatus, which winds a plurality of wires simultaneously around each of a plurality of salient poles of an armature core. The wire winding apparatus includes a wire nozzle unit, which is rotatable about a rotational axis of the wire nozzle unit, and a rotating means for rotating the wire nozzle unit about the rotational axis of the wire nozzle unit. The rotational axis of the wire nozzle unit is generally perpendicular to the axis of the armature core, and the wire nozzle unit includes a plurality of wire nozzles, each of which receives and guides a corresponding one of the wires along each of two slots, which are arranged on opposite sides, respectively, of each of the plurality of salient poles, to wind the wires around each of the plurality of salient poles. The rotating means is constructed to rotate the wire nozzle unit 180 degrees when the wire nozzle unit is moved from one of the two slots to the other of the two slots.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

One embodiment of the present invention will be described with reference to the accompanying drawings.

Figure 1:
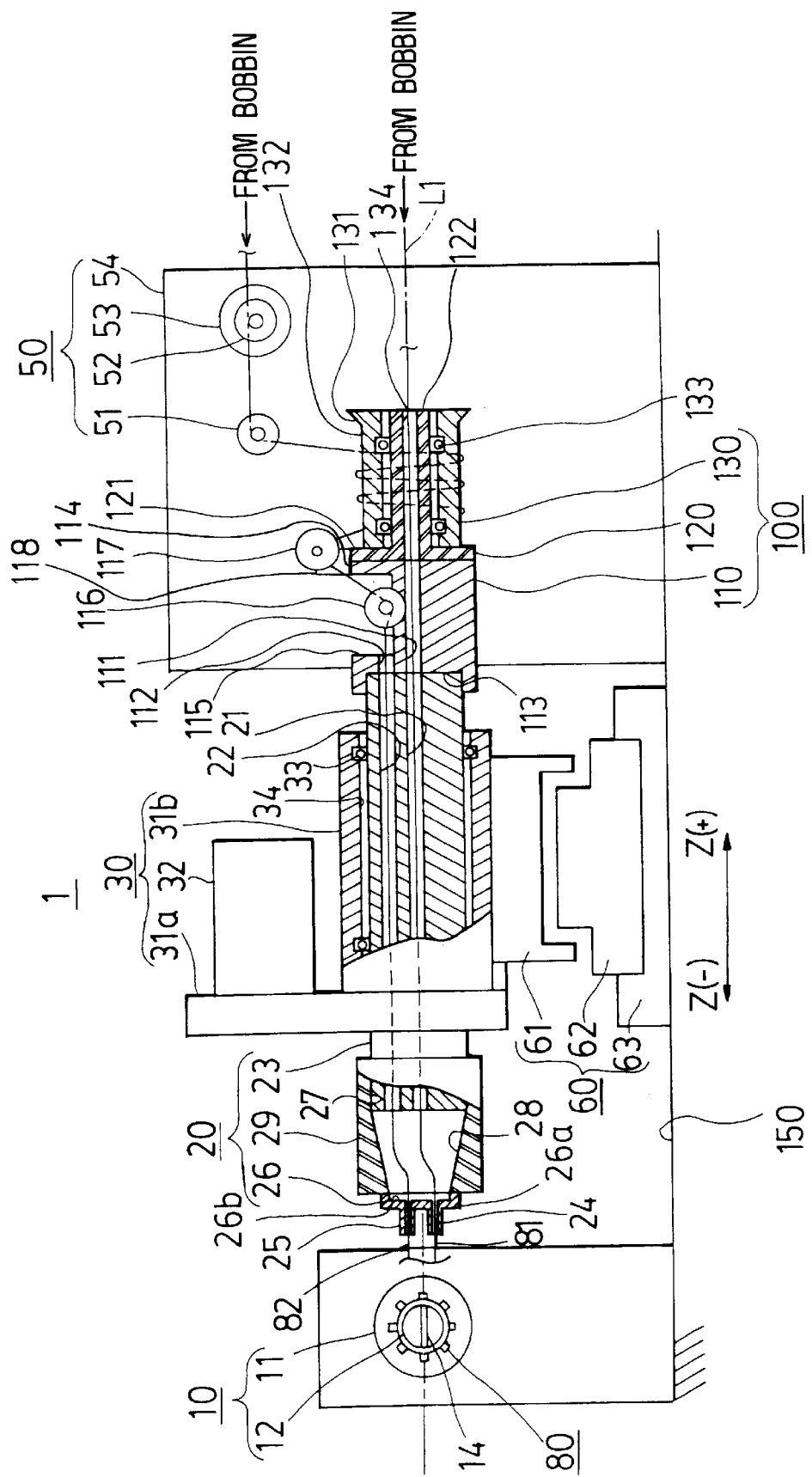
FIG. 1 is a partially fragmented schematic longitudinal cross-sectional view of a wire winding apparatus according to an embodiment of the present invention.

With reference to FIG. 1, a wire winding apparatus 1 is used to simultaneously wind a plurality of wires around an armature used, for example, in a brushless motor in a manner that restrains twisting of the wires. The wire winding apparatus 1 includes a work holding device 10, a wire nozzle device 20, a nozzle rotating device (serving as a rotating means) 30, a wire take-up device 100, a tensioner device 50 and a slide device 60.

The work holding device 10 includes a work rotating arrangement 11, a work holder 12 and a speed reducing mechanism (not shown). The work holder 12 is shaped as a cylindrical body and extends in a direction of an x-axis (a direction perpendicular to a plane of FIG. 1) of the wire winding apparatus 1. A free end of the work holder 12 is constructed to hold an armature 80, which serves as a work. The free end of the work holder 12 includes a retainer 15 and a hooking portion 14. The retainer 15 is shaped as a bar that extends in a direction perpendicular to an axis of the work holder 12. The hooking portion 14 is shaped as a groove that can receive a first wire 81 and a second wire 82.

The work rotating arrangement 11 includes a servomotor (not shown). An output shaft of the servomotor is connected to the work holder 12 through the speed reducing mechanism. The work rotating arrangement 11 receives a control signal from a central control device (not shown) and adjusts a rotational position of the work holder 12 to a predetermined rotational angle based on the control signal.

The wire nozzle device 20 includes a first rotatable pipe 23, a wire nozzle unit 26 and a nozzle support 29. The first rotatable pipe 23 is shaped as a cylindrical body that extends in a direction of a z-axis (indicated by double headed arrows in FIG. 1). The first rotatable pipe 23 includes a first insertion passage (or path) 21 and a second insertion passage (or path) 22, which extend through the first rotatable pipe 23 in the direction of the z-axis. The first insertion passage 21 has an inner diameter that allows insertion of the first wire 81 in the first insertion passage 21. The second insertion passage 22 has an inner diameter that allows insertion of the second wire 82 in the second insertion passage 22. The first insertion passage 21 extends along a rotational axis L1 of the first rotatable pipe 23, and the second insertion passage 22 is outwardly offset from the rotational axis L1 in a radial direction of the first rotatable pipe 23. A gear (not shown) is arranged at a predetermined position of the first rotatable pipe 23 and extends in a circumferential direction of the first rotatable pipe 23. The gear constitutes a part of a drive force transmitting mechanism for transmitting drive force for rotating the first rotatable pipe 23 and is received in a motor support structure 31a.

The wire nozzle unit 26 includes a cylindrical mount 26a and first and second wire nozzles 24, 25. Each of the first and second wire nozzles 24, 25 is shaped as a tube that extends in a direction perpendicular to an end surface of the mount 26. The wire nozzle unit 26 is secured to an end surface of the nozzle support 29, which faces the work holding device 10, by securing elements, such as bolts. When the wire nozzle unit 26 is secured to the nozzle support 29, the first wire nozzle 24 and the second wire nozzle 25 are symmetrically disposed about the rotational axis L1.

A recess (or recessed space) 26b is formed in an end of the mount 26a, which faces the nozzle support 29. The recess 26b is communicated with an interior of each of the first and second wire nozzles 24, 25.

The nozzle support 29 is shaped as a generally rectangular parallelepiped body. A recessed engaging portion 27 is formed in an end of the nozzle support 29, which faces the first rotatable pipe 23. The first rotatable pipe 23 is fitted into the recessed engaging portion 27 by close fitting, so that the nozzle support 29 and the wire nozzle unit 26 secured to the nozzle support 29 are secured to the first rotatable pipe 23. Furthermore, a communicating hole 28 axially extends through the nozzle support 29 and has a decreasing inner diameter, which progressively decreases from the recessed engaging portion 27 toward the end surface of the nozzle support 29, which faces the work holding device 10. An opening of the communicating hole 28, which faces the work holding device 10, has an inner diameter that substantially coincides with an inner diameter of the recess 26b.

The nozzle rotating device 30 includes the motor support structure 31a, a pipe support structure 31b and a servomotor 32 and rotates the first rotatable pipe 23. The motor support structure 31a is shaped as a hollow rectangular parallelepiped body, which extends in a direction perpendicular to an installation surface 150 of the wire winding apparatus 1. The pipe support structure 31b is secured to a lower part of the motor support structure 31a, and the servomotor 32 is arranged in an upper part of the motor support structure 31a. A gear (not shown) is arranged around an output shaft of the servomotor 32 for transmitting a drive force to the first rotatable pipe 23 of the wire nozzle device 20 and is received in the motor support structure 31a.

The pipe support structure 31b is shaped as a rectangular parallelepiped body that has a through hole 34, which penetrates through the pipe support structure 31b in the direction of the z-axis. The pipe support structure 31b is secured on an x-axis table 61 described later. The first rotatable pipe 23 is inserted into the through hole 34 and is rotatably supported by bearings 33 arranged at predetermined positions in the through hole 34. Furthermore, the one end of the first rotatable pipe 23 is connected to the nozzle support 29 through the motor support structure 31a.

A drive force transmitting mechanism (not shown), which includes, for example, a toothed belt, is received in the motor support structure 31a. One end of the drive force transmitting mechanism is meshed with the gear arranged around the output shaft of the servomotor 32, and the other end of the drive force transmitting mechanism is meshed with the gear arranged around the first rotatable pipe 23. When the drive force of the servomotor 32 is transmitted to the gear arranged around the first rotatable pipe 23 through the drive force transmitting mechanism, the first rotatable pipe 23, the nozzle support 29, which is connected to the first rotatable pipe 23, and the wire nozzle unit 26 of the wire nozzle device 20 are rotated.

The servomotor 32 receives a control signal from the central control device (not shown). The servomotor 32 adjusts a rotational position of the wire nozzle unit 26 to a predetermined rotational angle based on the control signal.

The wire take-up device 100 includes a pipe coupler 110, a second rotatable pipe 120 and a drum (serving as a rotatable body) 130. The pipe coupler 110 is shaped as a generally rectangular parallelepiped body. A recessed engaging portion 113 is formed in an end surface of the pipe coupler 110, which faces the first rotatable pipe 23. The first rotatable pipe 23 is fitted into the recessed engaging portion 113 by close fitting, so that the first rotatable pipe 23 is secured to the pipe coupler 110, and the pipe coupler 110 rotates together with the first rotatable pipe 23.

A recess 115 is formed in a top surface 114 of the pipe coupler 110. A first pulley 116 is rotatably supported, for example, by a bracket (not shown) at a predetermined position at the bottom of the recess 115. A second pulley 117 is rotatably supported, for example, by a bracket 118 in the top surface 114 on a second rotatable pipe 120 side of the first pulley 116. The first pulley 116 and the second pulley 117 rotate together with the pipe coupler 110 about the rotational axis L1 around the drum 130.

The pipe coupler 110 has first and second insertion passages 111, 112, each of which axially extends through the pipe coupler 110. The first insertion passage 111 is formed along the rotational axis L1 and is communicated with the first insertion passage 21 of the first rotatable pipe 23 and also with an insertion passage 134 of the second rotatable pipe 120. The second insertion passage 112 of the pipe coupler 110 is communicated with the second insertion passage 22 of the first rotatable pipe 23. Furthermore, the second insertion passage 112 of the pipe coupler 110 extends parallel to the rotational axis L1 and is opened to the recess 115.

The second pulley 117 guides the second wire 82, which has been supplied from a second wire bobbin (not shown) and has been wound around the drum 130, to the first pulley 116 to supply the second wire 82 to the armature 80, around which the second wire 82 is wound. The first pulley 116 guides the second wire 82, which has been guided by the second pulley 117, into the second insertion passage 112.

The second rotatable pipe 120 includes a cylindrical shaft pipe 122. A flange 121 is formed at an end of the shaft pipe 122, which faces the pipe coupler 110. Furthermore, an insertion passage 134 extends through the shaft pipe 122 of the second rotatable pipe 120 along the rotational axis L1. The flange 121 is jointed to an opposed end surface of the pipe coupler 110, by securing elements, such as bolts (not shown), so that the second rotatable pipe 120 is secured to the pipe coupler 110 and is rotated together with the pipe coupler 110.

The drum 130 is provided to restrain twisting of the wires wound around the armature 80. The drum 130 is shaped as a hollow cylindrical body having a through hole that penetrates through the drum 130 along the rotational axis L1. Bearings 133 are arranged at corresponding predetermined positions in the through hole of the drum 130. The shaft pipe 122 is rotatably supported by the bearings 133. An annular drum stopper 131, which has an outer diameter larger than that of the drum 130, is connected to a free end of the shaft pipe 122. The drum stopper 131 prevents the drum 130 from falling out of the shaft pipe 122.

A wire take-up surface 132 for taking up the second wire 82 extends circumferentially around the drum 130. A way of restraining the twisting of the first wire 81 and the second wire 82 through use of the drum 130 will be described later along with a way of winding the wires around the armature 80.

The tensioner device 50 includes a first pulley 51, a second pulley 52, a servomotor 53 and a pulley support 54. The first pulley 51 includes a rotatable pulley (not shown). The second pulley 52 includes a pulley having a friction surface at a contact portion, which contacts with the second wire 82.

The servomotor 53 includes an output shaft (not shown). A torque limiter mechanism (not shown) is provided to the output shaft. The torque limiter mechanism reduces an output torque by reducing electric current supplied to a motor drive circuit (not shown) when a load equal to or a greater than a predetermined value is applied to the output shaft of the servomotor 53. The servomotor 53 receives a control signal from the central control device (not shown). The servomotor 53 rotates the output shaft at a predetermined rotational speed based on the control signal.

The second pulley 52 is connected to the output shaft of the servomotor 53. The servomotor 53 and the second pulley 52 are securely supported by the pulley support 54 on a side of the first pulley 51 opposite to the wire take-up device 100 and are used to guide the second wire 82, which is supplied from the second wire bobbin (not shown), to the first pulley 51.

The first pulley 51 is securely supported by the pulley support 54 such that the first pulley 51 is positioned above the free end of the drum 130. The first pulley 51 guides the second wire 82, which is guided to the first pulley 51 from the second pulley 52, to the drum 130.

The slide device 60 includes the x-axis table 61, a z-axis table 62, a base 63, an x-axis servomotor (not shown) and a z-axis servomotor (not shown). The x-axis table 61 securely supports the pipe support structure 31b and slides the pipe support structure 31b on the z-axis table 62 in a longitudinal direction (direction of the x-axis) of the work holder 12. The z-axis table 62 slidably supports the x-axis table 61 and is slidably supported by the base 63 in a direction (direction of the z-axis) parallel to the rotational axis L1.

Each of the x-axis servomotor and the z-axis servomotor receives a control signal from the central control device (not shown) and rotates its output shaft at a predetermined rotational speed based on the control signal. The x-axis table 61 is connected to the x-axis servomotor, and the z-axis table 62 is connected to the z-axis servomotor. The x-axis servomotor and the z-axis servomotor are controlled by the central control device, so that each of the x-axis table 61 and the z-axis table 62 slides automatically.

The central control device executes a program installed, for example, by an operator (not sown) and transmits control signals to the work holding device 10, the nozzle rotating device 30, the tensioner device 50 and the slide device 60.

In the wire winding apparatus 1, the first wire 81 is supplied from a first wire bobbin (not shown) into the insertion passage 134 of the second rotatable pipe 120 and is then supplied to the work holding device 10 through the first insertion passage 111 of the pipe coupler 110, the first insertion passage 21 of the first rotatable pipe 23, the communicating passage 28 of the nozzle support 29 and the first wire nozzle 24. The second wire 82 is supplied from the second wire bobbin (not shown) into the second insertion passage 112 of the pipe coupler 110 through the second pulley 52 and the first pulley 51 of the tensioner device 50, the drum 130, the second pulley 117 and the first pulley 116. From there, the second wire 82 is supplied to the work holding device 10 through the second insertion passage 22 of the first rotatable pipe 23, the communicating passage 28 of the nozzle support 29 and the second wire nozzle 25. The first and second pulleys 51, 52 of the tensioner device 50, the first and second pulleys 116, 117 of the wire take-up device 100, the first and second insertion passages 111, 112 of the pipe coupler 110, the first and second insertion passages 21, 22 of the first rotatable pipe 23, the communicating hole 28 of the nozzle support 29 and the insertion passage 134 of the second rotatable pipe 120 collectively serve as a wire guiding means for guiding each of the wires 81, 82.

Figure 2:
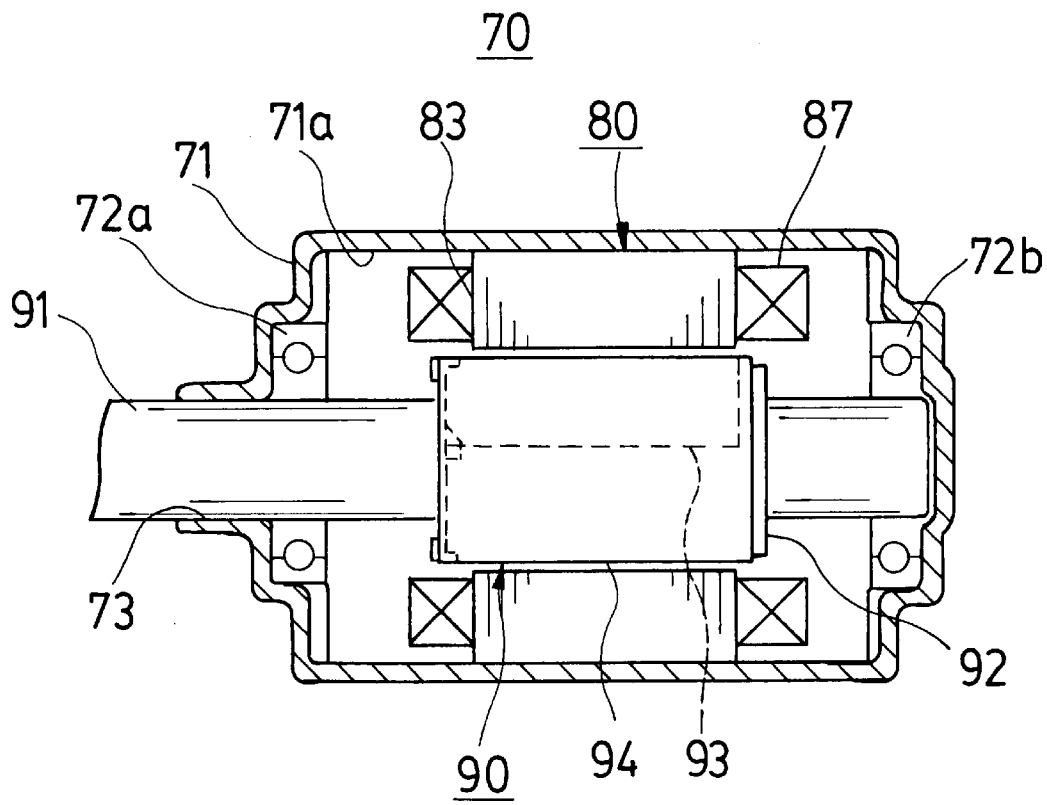
FIG. 2 is a longitudinal cross-sectional view of a dynamo electric machine according to the embodiment.

A multiphase dynamo electric machine 70, which includes the armature 80 manufactured through use of the wire winding apparatus 1 and the method described later, will be described. The dynamo electric machine 70 can be, for example, an inner rotor type brushless motor used for a power steering system of an automobile. As shown in FIG. 2, the dynamo electric machine 70 includes a housing 71, the armature 80 and a rotor 90.

The housing 71 is made of a non-magnetic metal material, such as an aluminum material, and is shaped as a hollow cylindrical body. The armature 80 is secured to an inner circumferential surface 71a of the housing 71. Bearings 72a, 72b are arranged at axial ends, respectively, of the housing 71. An opening 73 for receiving a rotatable shaft 91 is formed at the end of the housing 71, at which the bearing 72a is arranged.

Figure 3:
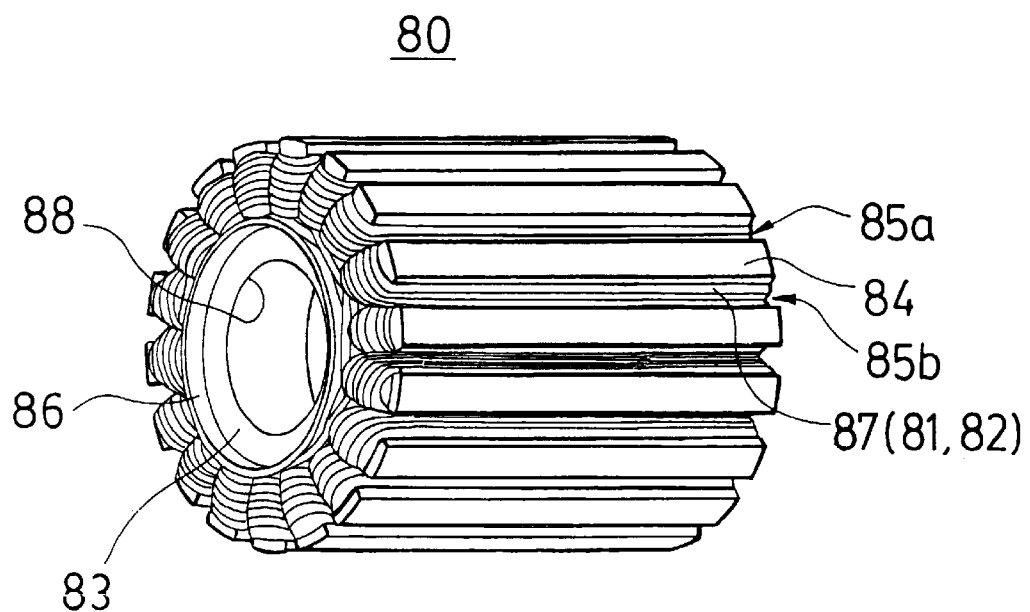
FIG. 3 is a perspective view of an armature according to the embodiment.

The armature 80 shown in FIG. 3 includes an armature core 83, a winding portion 87 and an insulator 86. The armature core 83 includes a plurality of disk shaped thin plate cores (not shown), which are stacked one after the other. The winding portion 87 includes the first and second wires 81, 82 wound around the salient poles 84. The insulator 86 insulates the armature core 83 from the winding portion 87. Each of the first and second wires 81, 82 is preferably a flat wire having a rectangular cross-section. Alternatively, each of the first and second wires 81, 82 can be a wire having a circular cross-section.

The armature core 83 includes the salient poles 84, each of which projects radially outwardly. The salient poles 84 are arranged at predetermined intervals. Each slot 85a, 85b is formed between corresponding two salient poles 84. A central hole 88 axially penetrates through the center of the armature core 83. The central hole 88 is shaped and sized such that the rotor 90 shown in FIG. 2 can be received in the central hole 88.

The rotor 90 shown in FIG. 2 includes the rotatable shaft 91, a rotor spacer 92, magnets 93 and a magnetic yoke 94. The rotatable shaft 91 is shaped as a solid cylindrical body. One end of the rotatable shaft 91 is rotatably supported by the bearing 72a, and the other end of the rotatable shaft 91 is rotatably supported by the bearing 72b. Furthermore, the one end of the rotatable shaft 91, which is rotatably supported by the bearing 72a, extends out from the housing 71 through the opening 73.

The rotor spacer 92, which is shaped as a cylindrical body, is arranged around a base portion of the rotatable shaft 91. Magnets 93 are securely arranged radially outward of the rotor spacer 92. The magnetic yoke 94, which is shaped as a cylindrical body, is arranged radially outward of the magnets 93.

In the dynamo electric machine 70, when electric power is supplied from an external power source (not shown), a magnetic field is generated by the winding portion 87, so that the winding portion 87 and the magnets 93 generate a magnetic flux to rotate the rotor 90.

A winding method for winding the first wire 81 and the second wire 82 around the salient poles 84 of the armature 80 through use of the wire winding apparatus 1 shown in FIG. 1 will be described with reference to FIGS. 4 to 9. The winding method is performed after the insulator 86 is installed into the armature core 83. Thus, in the following description of the winding method, it is assumed that the armature 80, to which the insulator (not shown in FIGS. 4 to 9) is installed, has been secured to the work holder 12, and each of the first and second wires 81, 82 has been arranged in the corresponding predetermined path in the wire winding apparatus 1, as described above.

Figure 4:
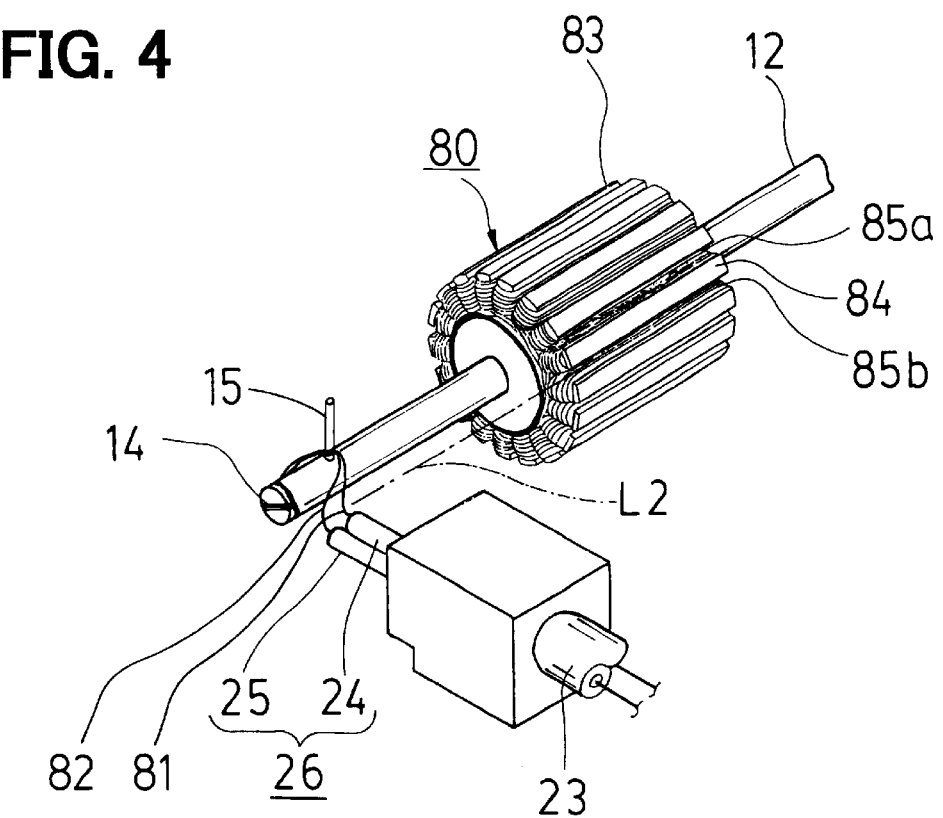
FIG. 4 is a schematic perspective view showing wire winding operation of the armature according to the embodiment.

First, with reference to FIG. 4, the first wire 81 and the second wire 82 are wound around and secured to the work holder 12. Here, one end of each of the first and second wires 81, 82 is held around the retainer 15 and is then wound around the free end of the work holder 12 and is finally hooked to the hooking portion 14 to prevent loosening of the end of each of the first and second wires 81, 82. Furthermore, the x-axis table 61 (FIG. 1) is slid to position the wire nozzle unit 26 (FIG. 4) adjacent the free end of the work holder 12. Also, the z-axis table 62 (FIG. 1) is slid, and the work rotating arrangement 11 is driven to adjust the rotational angle of the work holder 12, so that a distal end of the first wire nozzle 24 and a distal end of the second wire nozzle 25 are arranged along a line L2 that extends through a slot 85b in FIG. 4.

Figure 5:
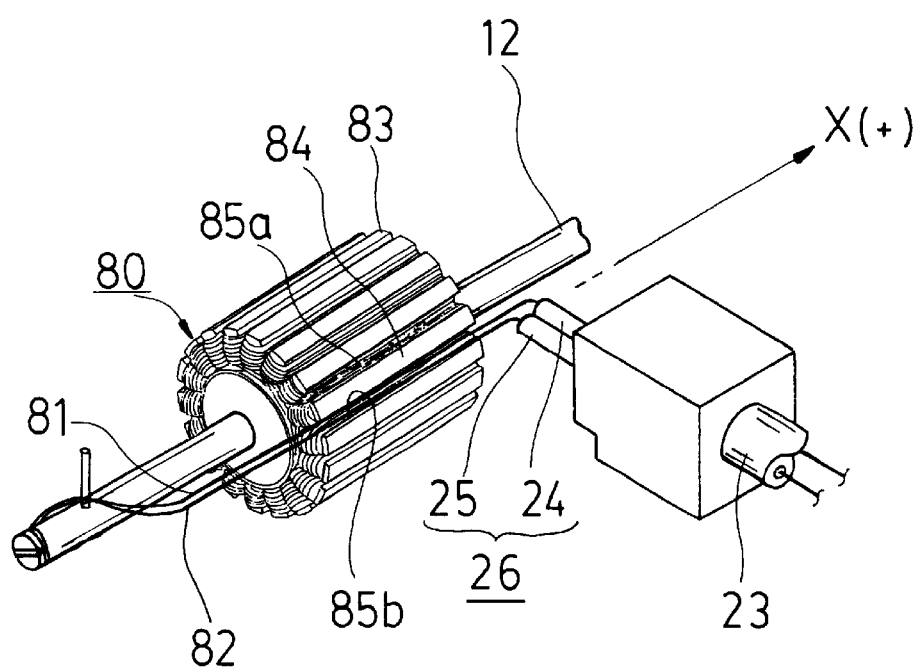
FIG. 5 is a schematic perspective view showing a state after moving a wire nozzle assembly from the state shown in FIG. 4.

The wire nozzle unit 26 is moved a predetermined distance in the direction of the x-axis (+) from the position shown in FIG. 4 to the position shown in FIG. 5. Here, the x-axis table 61 (FIG. 1) is slid, so that the first wire nozzle 24 and the second wire nozzle 25 (FIG. 5) are moved from the free end of the work holder 12 into the slot 85b and are passed through the slot 85b. By moving the wire nozzle unit 26 in the direction of the x-axis (+) in the above described manner, the first wire 81 and the second wire 82 are arranged in the slot 85b.

Figure 6:
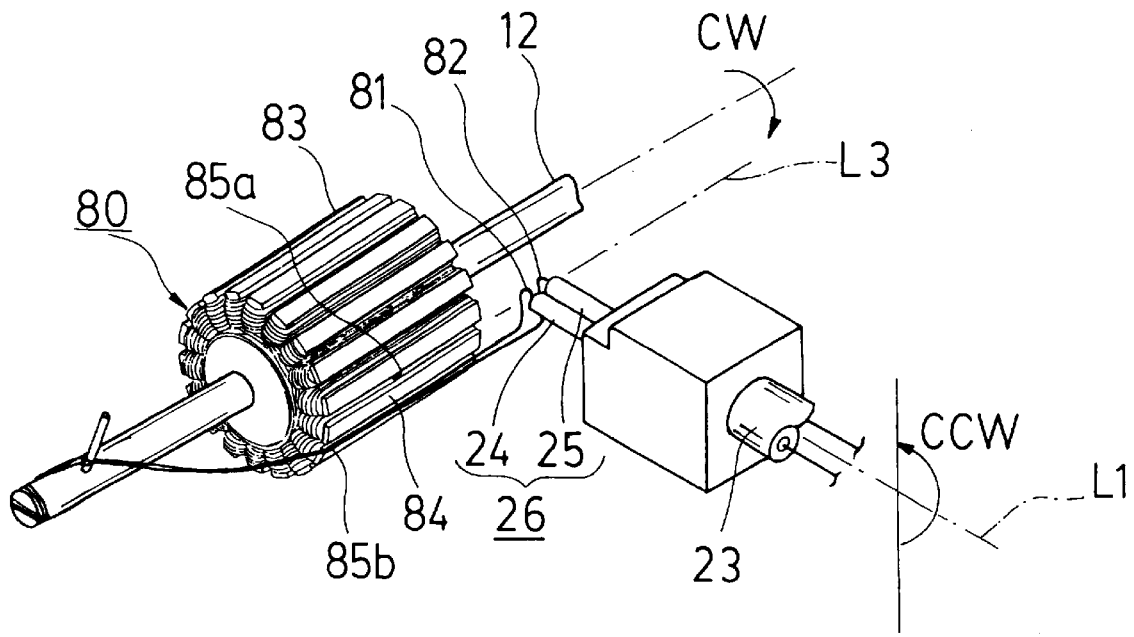
FIG. 6 is a schematic perspective view showing a state after moving the wire nozzle assembly and a work holder from the state shown in FIG. 5.

Next, the wire nozzle unit 26 is rotated about the rotational axis L1, and the rotational angle of the work holder 12 is adjusted, so that the state is changed from the one shown in FIG. 5 to the other shown in FIG. 6. Here, the servomotor 32 (FIG. 1) is driven such that the wire nozzle unit 26 is rotated 180 degrees about the rotational axis L1 in FIG. 6. At the same time, the work rotating arrangement 11 (FIG. 1) is driven to adjust the rotational angle of the work holder 12 in FIG. 6, so that the first wire nozzle 24 and the second wire nozzle 25 are arranged along a line L3 that passes through the slot 85a. The rotational direction of the wire nozzle unit 26 is the counter clockwise direction (CCW) when the wire nozzle unit 26 is seen from a base end side of the first rotatable pipe 23. The rotational direction of the work holder 12 is the clockwise (CW) direction when the work holder 12 is seen from a free end side of the work holder 12 toward a base end side of the work holder 12.

Figure 7:
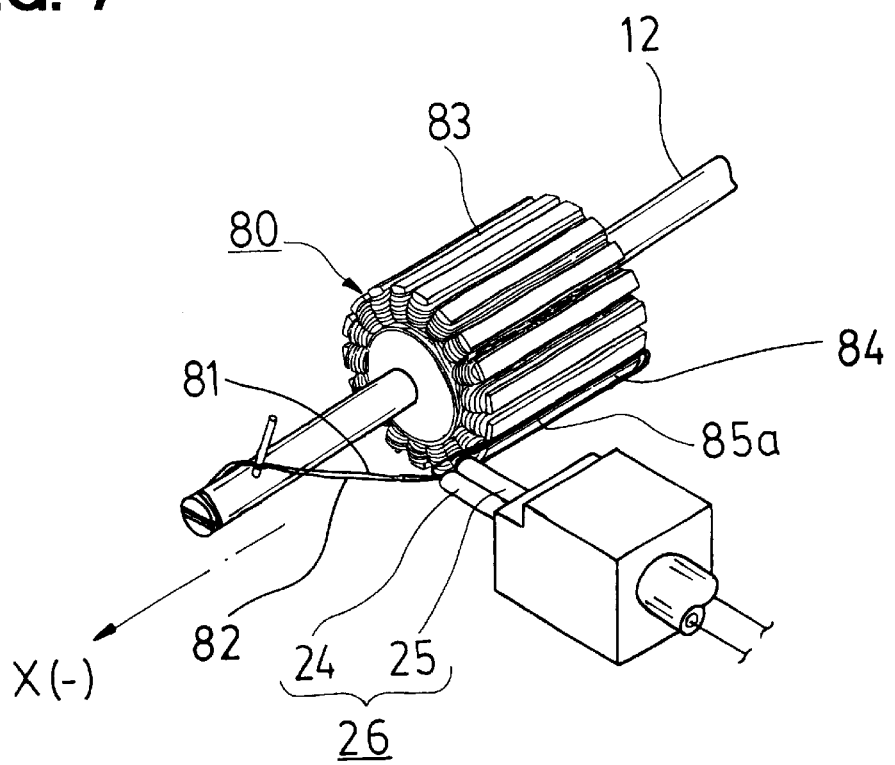
FIG. 7 is a schematic perspective view showing a state after moving the wire nozzle assembly from the state shown in FIG. 6.

Then, the wire nozzle unit 26 is moved a predetermined distance from the position shown in FIG. 6 to the position shown in FIG. 7 in the direction of the x-axis (−). Here, the x-axis table 61 (FIG. 1) is slid, so that the first and second wire nozzles 24, 25 (FIG. 7) are moved from the base end side of the work holder 12 toward the slot 85a and are passed through the slot 85a. By moving the wire nozzle unit 26 in the direction of the x-axis (−) in the described manner, the first wire 81 and the second wire 82 are arranged in the slot 85a.

Figure 10:
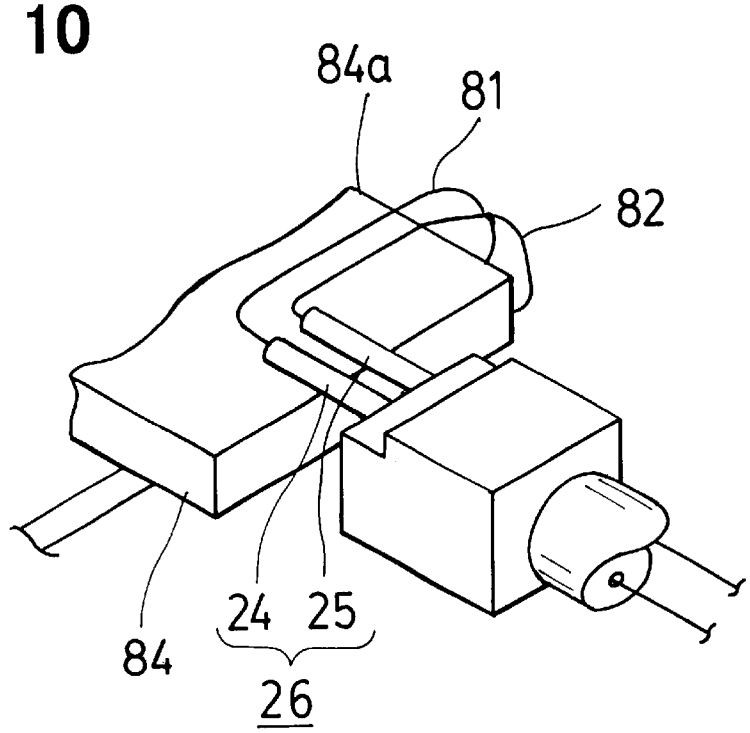
FIG. 10 is an enlarged partial perspective view showing winding operation for winding wires around a salient pole of the armature according to the present embodiment.
Figure 11:
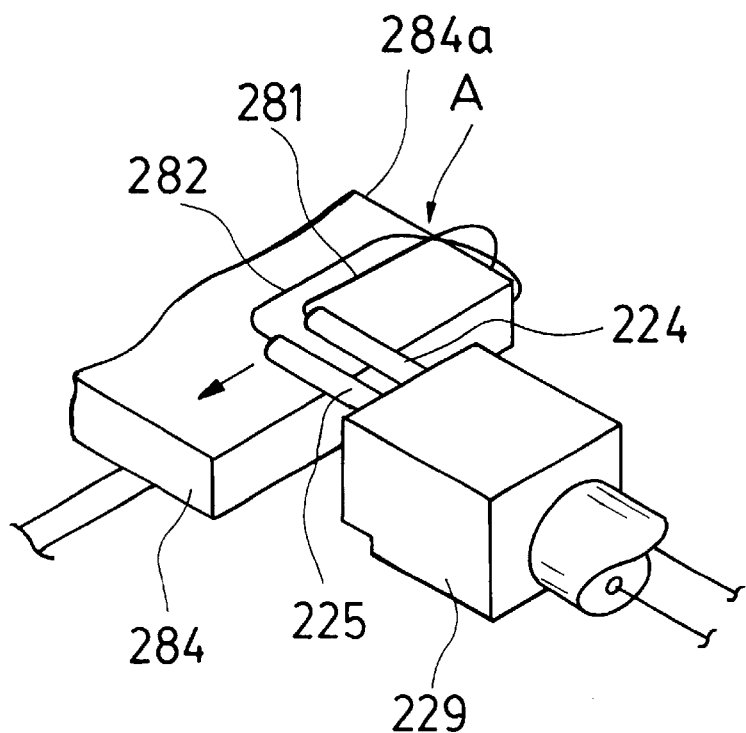
FIG. 11 is an enlarged partial perspective view showing winding operation for winding wires around a salient pole of an armature using a previously proposed wire winding apparatus.

Furthermore, when the wire nozzle unit 26 is moved from the slot 85b to the slot 85a, the wire nozzle unit 26 is rotated 180 degrees, so that the first wire nozzle 24 is always positioned to face the advance direction (i.e., the first wire nozzle 24 always leads the second wire nozzle 25 in the advance direction). While the first nozzle 24 is faced toward the advance direction, the wire nozzle unit 26 is slid, so that the first wire 81 and the second wire 82 are wound around the salient pole 84. Thus, a winding path of the first wire nozzle 24 and a winding path of the second wire nozzle 25 are not crossed with each other at a corner 84a of the salient pole 84 shown in FIG. 10. Thus, the twisting of first wire 81 of the first wire nozzle 24 and the second wire 82 of the second wire nozzle 25 is advantageously prevented, and thus the first wire 81 and the second wire 82 are wound around each corresponding salient pole 84 while maintaining the proper alignment of the firs wire 81 and the second wire 82 relative to each other.

Figure 8:
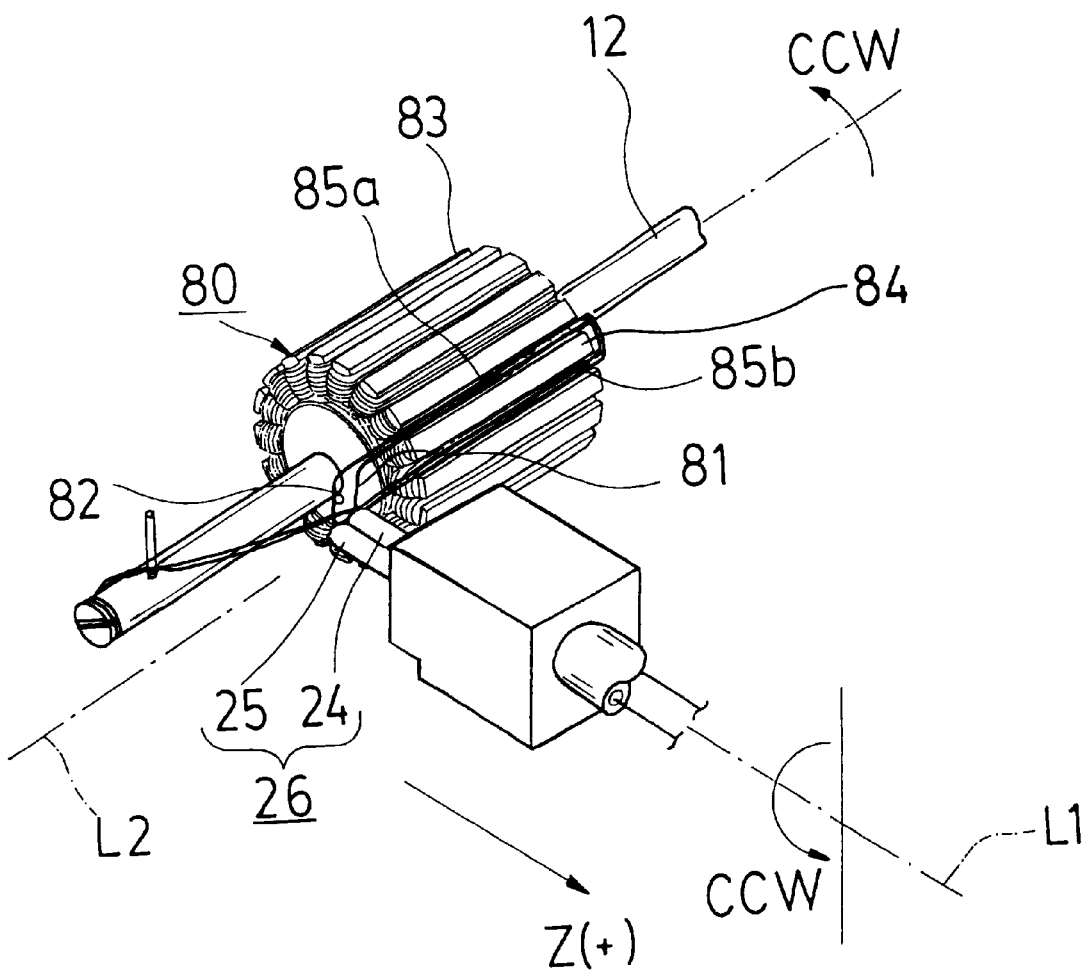
FIG. 8 is a schematic perspective view showing a state after moving the wire nozzle assembly from the state shown in FIG. 7.

Next, the wire nozzle unit 26 is rotated, and the rotational angle of the work holder 12 is adjusted, so that the state is changed from the one shown in FIG. 7 to the other shown in FIG. 8. Here, the servomotor 32 (FIG. 1) is driven, so that the wire nozzle unit 26 is rotated 180 degrees about the rotational axis L1 in FIG. 8. At the same time, the work rotating arrangement 11 (FIG. 1) is driven, so that the rotational angle of the work holder 12 in FIG. 8 is adjusted, and the first wire nozzle 24 and the second wire nozzle 25 are arranged along the line L2 that passes through the slot 85b. The rotational direction of the wire nozzle unit 26 is the counter clockwise (CCW) direction in FIG. 8 when the wire nozzle unit 26 is seen from the base end side of the first rotatable pipe 23. The rotational direction of the work holder 12 is the counter clockwise (CCW) direction in FIG. 8 when the work holder 12 is seen from the free end side of the work holder 12 toward the base end side of the work holder 12.

This is the end of the single turn wire winding operation for winding each of the first wire 81 and the second wire 82 only once around the salient pole 84 while maintaining proper alignment of the first wire 81 and the second wire 82 relative to each other. In a case where each of the first wire 81 and the second wire 82 are wound around the salient pole 84 multiple times, the z-axis table 62 (FIG. 1) is slid, so that the wire nozzle unit 26 shown in FIG. 8 is moved a predetermined distance in the direction of the z-axis (+), and the single turn wire winding operation described above with reference to FIGS. 4 to 8 is repeated. When the single turn wire winding operation and the movement of the wire nozzle unit 26 in the direction of z-axis (+) are repeated a predetermined number of times, the concentrated wire winding operation for winding each wire around the single salient pole 84 multiple times ends.

After the concentrated wire winding operation ends, the work rotating arrangement 11 (FIG. 1) is driven to adjust the position of the work holder 12 to a predetermined rotational angle, and the concentrated wire winding operation is performed on another salient pole 84 in the manner described above. This concentrated wire winding operation is performed on all of the salient poles 84 (i.e., one set of salient poles 84) in the same phase of the dynamo electric machine 70. For example, in a case of an armature that has three phases and four poles, the concentrated wire winding operation is performed on the salient poles of all of the four poles.

The wire winding apparatus 1 of the present embodiment is constructed to prevent twisting of the wires during the concentrated wire winding operation. A way of preventing the twisting of the wires will be described.

In the concentrated wire winding operation, when the first rotatable pipe 23 shown in FIG. 1 is rotated, the second pulley 117, around which the second wire 82 is guided, is rotated together with the first rotatable pipe 23 about the rotational axis L1 around the drum 130. When the second pulley 117, around which the second wire 82 is guided, is rotated around the drum 130, the second wire 82 is wound around the wire take-up surface 132 of the drum 130.

Figure 9:
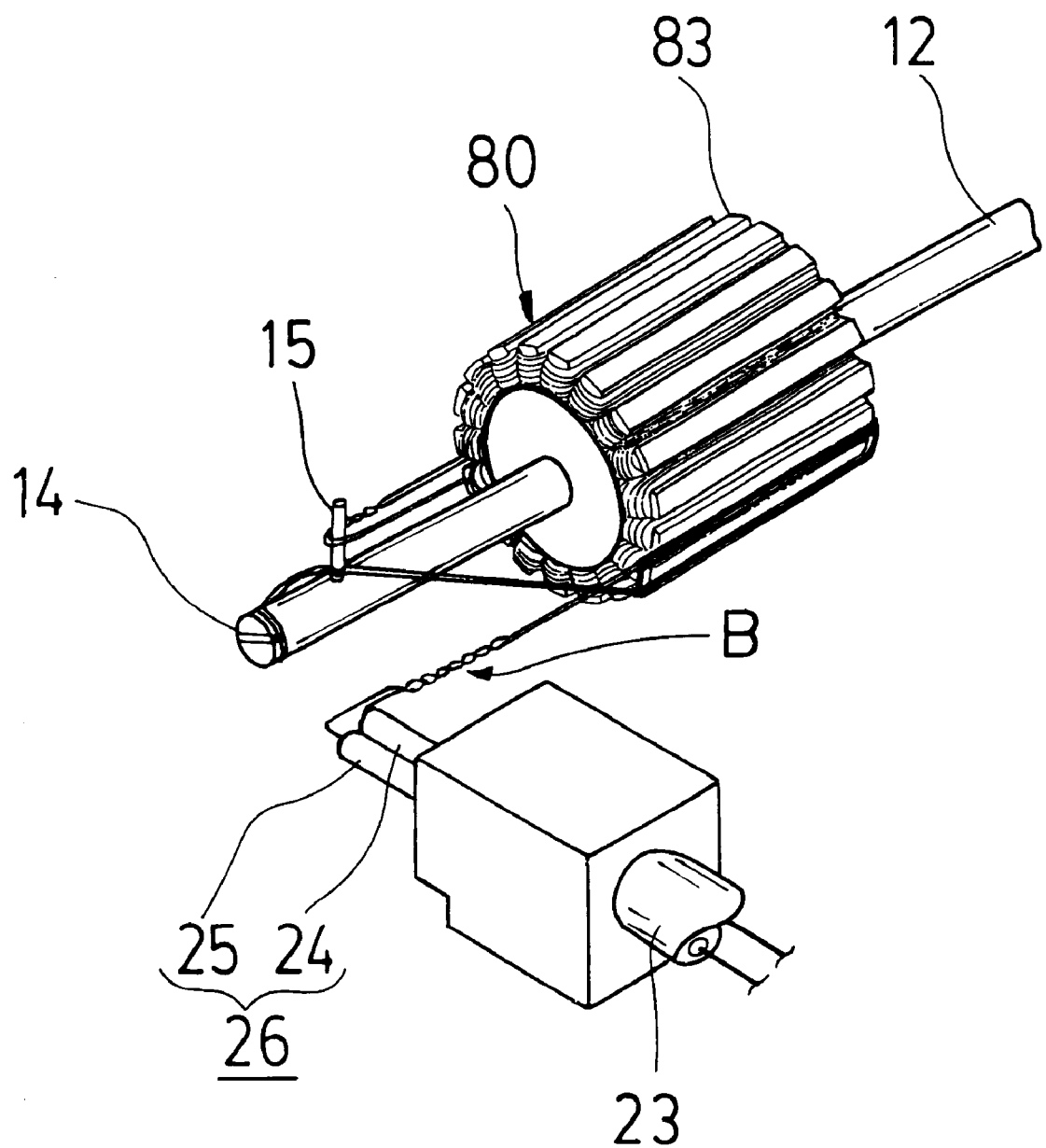
FIG. 9 is a schematic perspective view showing rotation of the wire nozzle assembly according to the present embodiment.

After the concentrated wire winding operation is performed on all of the salient poles 84 in the same phase, the wire nozzle unit 26 shown in FIG. 9 is positioned sufficiently apart from the armature 80, and the first rotatable pipe 23 and the wire nozzle unit 26 are rotated in a direction opposite to the rotational direction of the first rotatable pipe 23 measured during the concentrated wire winding operation. Thus, by rotating the wire nozzle unit 26 in this manner, the first wire 81, which protrudes from the first wire nozzle 24, and the second wire 82, which protrudes from the second wire nozzle 25, are twisted. In FIG. 9, "B" indicates twists of the first wire 81 and the second wire 82 in the extended section of the wires 81, 82.

When the first rotatable pipe 23 is rotated in the direction opposite to the rotational direction of the first rotatable pipe 23 measured during the concentrated wire winding operation, the second wire 82, which is wound around the wire take-up surface 132 shown in FIG. 1, is released from the wire take-up surface 132. Thus, by rotating the second pulley 52 in a predetermined direction, the second wire 82 released from the wire take-up surface 132 is pulled toward the second wire bobbin (not shown). Then, when the second wire 82 is entirely released from the wire take-up surface 132, the first rotatable pipe 23 is stopped.

In the manner described above, the concentrated wire winding operation on all of the salient poles 84 in the same phase ends, and the work holder 12 and the wire nozzle unit 26 are moved in the predetermined manner, so that the extended section of the wires 81, 82, in which the twists (indicated by "B" in FIG. 9) of the first wire 81 and the second wire 82 are formed, is held around the retainer 15 to complete the wire winding operation performed on all of the salient poles 84 in the same phase.

As described above, in the wire winding operation of the present embodiment, the extended section of the wires 81, 82 is formed by extending the first wire 81 and the second wire 82 from the salient pole 84 (or armature core 83) before proceeding to the wire winding operation for winding the wires 81, 82 around the salient poles 84 of the other phase is performed after completion of the wire winding operation for winding the wires 81, 82 around the salient poles 84 of the one phase. Then, the second wire 82 wound around the drum 130 is released, and the twists of the wires 81, 82 are concentrated in the extended wire section. In this way, the twisting of the wires 81, 82, which occurs when the wires 81, 82 are wound around the salient poles 84 of the one phase, can be eliminated from the armature 80, so that the wires 81, 82 can be continuously wound around the salient poles 84 of the other phase.

Then, as shown in FIG. 4, the first wire 81 and the second wire 82 are inserted in the hooking portion 14 and are wound around and secured to the free end of the work holder 12, and the wire winding operation for winding the first wire 81 and the second wire 82 around the salient poles 84 of the other phase is performed. When the wires are wound around all of the salient poles of all phases, the wire winding operation of the armature 80 is completed.

Then, after completion of the wire winding operation, the extended sections of the wires 81, 82, in which the twists (indicated by "B" in FIG. 9) are formed, are cut by a predetermined manner, and a predetermined wiring operation for electrically connecting the wires is performed. Thus, the manufacturing of the armature 80 shown in FIG. 3 is completed.

As described above, in the wire winding apparatus 1 shown in FIG. 1, the wire nozzle unit 26 is rotated by the nozzle rotating device 30 in such a manner that intersecting of the winding path of the first wire 81 and the winding path of the second wire 82 is prevented, so that twisting of the first wire 81, which is wound around the corresponding salient pole 84 by the first wire nozzle 24, and the second wire 82, which is wound around the corresponding salient pole 84 by the second wire nozzle 25, can be prevented.

Furthermore, since the wire winding apparatus 1 includes the wire take-up device 100, the first wire 81 and the second wire 82 can be taken up by the wire take-up device 100 in the rotational direction of the wire nozzle unit 26 when the wire nozzle unit 26 is rotated. Thus, twisting of the first wire 81 and the second wire 82 is prevented between the wire nozzle unit 26 and the wire bobbins (not shown).

As described above, the present embodiment provides the following advantages.

(1) In the wire winding operation shown in FIGS. 6 and 8, the wire nozzles 24, 25 are rotated 180 degrees, so that intersecting of the winding path of the first wire 81 and the winding path of the second wire 82 is prevented. Thus, it is possible to prevent intersecting of and twisting of the first wire 81, which is wound around the corresponding salient pole 84 by the first wire nozzle 24, and the second wire 82, which is wound around each corresponding salient pole 84 by the second wire nozzle 25. As a result, the first wire 81 and the second wire 82 can be wound around the corresponding salient pole 84 while maintaining proper alignment of the first wire 81 and the second wire 82 relative to each other.

(2) The single turn wire winding operation for winding the wires 81, 82 around the corresponding salient pole 84 discussed with reference to FIGS. 4 to 8 and the movement of the wire nozzle unit 26 in the direction (the radial direction of the armature core 83) of the z-axis (+) discussed with reference to FIG. 8 are repeated, so that the first wire 81 and the second wire 82 can be wound multiple times around the corresponding salient pole 84 while maintaining the proper alignment of the first wire 81 and the second wire 82 relative to each other. Furthermore, the wire nozzle unit 26 prevents intersecting of and twisting of the first wire 81 and the second wire 82, which are wound around the corresponding salient pole 84. Thus, the occupancy rate of the wires 81, 82 on each salient pole 84 can be increased.

(3) The first wire 81 shown in FIG. 1 is inserted into the cylindrical drum 130 (i.e., into the insertion passage 134), and the second wire 82 is wound around the drum 130 synchronously with rotation of the wire nozzle unit 26, so that the wire nozzle unit 26 can be rotated without causing twisting of the first wire 81 and the second wire 82. Thus, by rotating the wire nozzle unit 26, the first wire 81 and the second wire 82 are wound around the corresponding salient pole 84 while maintaining the proper alignment of the first wire 81 and the second wire 82 relative to each other. As a result, the occupancy rate of the wires 81, 82 on each salient pole 84 can be increased.

(4) In the wire winding operation of the present embodiment, the extended wire section is formed by extending the first wire 81 and the second wire 82 from the salient pole 84 before proceeding to the wire winding operation for winding the wires 81, 82 around the salient poles 84 of the other phase is performed after completion of the wire winding operation for winding the wires 81, 82 around the salient poles 84 of the one phase. Then, the second wire 82 wound around the drum 130 is released, and the twisted portions of the wires 81, 82 are concentrated in the extended wire section. In this way, the twisting of the wires 81, 82, which occurs when the wires 81, 82 are wound around the salient poles 84 of the one phase, can be eliminated from the armature 80, so that the wires 81, 82 can be continuously wound around the salient poles 84 of the other phase.

(5) The wire winding apparatus 1 shown in FIG. 1 includes the nozzle rotating device 30, which rotates the wire nozzle unit 26. Thus, when the first wire 81 and the second wire 82 are wound around the corresponding salient pole 84 of the armature core 83 shown in FIG. 3, the wire nozzle unit 26 can be rotated. As a result, by rotating the wire nozzle unit 26 using the nozzle rotating device 30, intersecting of the winding path of the first wire 81 and the winding path of the second wire 82 can be prevented. Therefore, twisting of the first wire 81 and the second wire 82 can be prevented, and the first wire 81 and the second wire 82 can be wound around each corresponding salient pole 84 while maintaining the proper alignment of the first wire 81 and the second wire 82 relative to each other.

(6) The wire winding apparatus 1 shown in FIG. 1 includes the z-axis table 62, which moves the wire nozzle unit 26 in the direction (the radial direction of the armature core 83) of the z-axis (+). Thus, by moving the wire nozzle unit 26 in the radial direction of the armature core 83 with use of the z-axis table 62, the first wire 81 and the second wire 82 can be wound multiple times around the corresponding salient pole 84 while maintaining alignment of the first wire 81 and the second wire 82 relative to each other. Furthermore, with use of the wire nozzle unit 26, it is possible to prevent intersecting of and twisting of the first wire 81 and the second wire 82 wound around the corresponding salient pole 84. Thus, the occupancy rate of the wires 81, 82 on each salient pole 84 can be increased.

(7) In the wire winding apparatus 1 shown in FIG. 1, with the provision of the wire take-up device 100, which takes up the second wire 82 in the rotational direction of the wire nozzle unit 26 when the wire nozzle unit 26 is rotated, the second wire 82 can be taken up around the drum 130 during the rotation of the wire nozzle unit 26, so that the wire nozzle unit 26 can be rotated without causing twisting of the first wire 81 and the second wire 82. Thus, by rotating the wire nozzle unit 26, the first wire 81 and the second wire 82 can be wound around each corresponding salient pole 84 while maintaining the proper alignment of the first wire 81 and the second wire 82 relative to each other. As a result, the occupancy rate of the wires 81, 82 on each salient pole 84 can be increased.

(8) In the armature 80 shown in FIG. 3, the first wire 81 and the second wire 82 are wound around each corresponding salient pole 84 while maintaining the proper alignment of the first wire 81 and the second wire 82 relative to each other. Thus, the occupancy rate of the wires 81, 82 on each salient pole 84 can be increased.

(9) The dynamo electric machine 70 shown in FIG. 2 includes the armature 80 shown in FIG. 3. Thus, the first wire 81 and the second wire 82 are wound around each corresponding salient pole 84 of the armature 80 while maintaining the proper alignment of the first wire 81 and the second wire 82 relative to each other, and the occupancy rate of the wires 81, 82 on each salient pole 84 is increased. As a result, the magnetic field force, which is generated by the magnets 93 of the rotor 90, the winding portion 87 and the armature core 83, is increased, so that the output of the rotatable shaft 91 shown in FIG. 2 can be improved.

The above embodiment can be modified as follows.

(a) In the wire winding apparatus shown in FIG. 1, the relative movement of the wire nozzle unit 26 relative to the work holder 12 is not necessarily produced by the x-axis table 61 and the z-axis table 62. Thus, for example, the wire nozzle unit 26 can be held stationary with respect to the direction of the x-axis (direction perpendicular to the plane of FIG. 1) and the direction of the z-axis (indicated by the double headed arrows in FIG. 1), and the work holding device 10 can be constructed to move in the direction of the x-axis and the direction of the z-axis. Furthermore, the wire nozzle unit 26 can be moved, for example, by a known robot arm (not shown) in a circumferential direction of the work holder 12.

(b) The central axis of the wire nozzle unit 26 shown in FIG. 6 is not necessarily located on the rotational axis L1. Thus, the central axis of the wire nozzle unit 26 can be radially outwardly offset a predetermined distance from the rotational axis L1. In this way, without requiring rotation of the work holder 12, the first wire nozzle 24 and the second wire nozzle 25 can be moved from the slot 85b into the slot 85a by rotating the wire nozzle unit 26.

(c) The armature 80, which has the first wire 81 and the second wire 82 wound around the armature 80 by the wire winding apparatus 1 shown in FIG. 1, is the armature used for the inner rotor type brushless motor of a known type. However, the present invention is not limited to this. For example, the wire winding apparatus 1 can be used to wind wires of an armature of any of an outer rotor type brushless motor, a brush DC motor or the like. Furthermore, the armature 80 is the armature having the concentrated winding where the wires are wound multiple times around each salient pole before proceeding to the next salient pole. The wire winding apparatus 1 can be used to manufacture an armature having a distributed winding.

(d) In the wire winding operation discussed with reference to FIGS. 4 to 8, the first wire 81 and the second wire 82 are inserted into the slot 85b and then into the slot 85a. However, the present invention is not limited to this. That is, the first wire 81 and the second wire 82 can be inserted into the slot 85a and then into the slot 85b.

Additional advantages and modifications will readily occur to those skilled in the art. The invention in its broader terms is therefore, not limited to the specific details, representative apparatus, and illustrative examples shown and described.

What is claimed is:

1. A method for manufacturing an armature comprising winding a plurality of wires simultaneously around each of a plurality of salient poles of an armature core using a wire nozzle unit, wherein the wire nozzle unit includes a plurality of wire nozzles, each of which receives and guides a corresponding one of the wires, wherein the winding of the wires includes:

placing the wires, which are supplied from the wire nozzle unit, between a first end and a second end of the armature core along a first one of two slots, which are arranged on opposite sides, respectively, of a corresponding one of the salient poles;

rotating the wire nozzle unit 180 degrees about a rotational axis of the wire nozzle unit, which is generally perpendicular to the axis of the armature core; and placing the wires, which are supplied from the wire nozzle unit, between the second end and the first end of the armature core along a second one of the two slots.

2. A method according to claim 1, wherein:

the winding of the wires further includes supplying each of the wires to the wire nozzle unit from a corresponding bobbin, wherein at least one of the wires is supplied to the wire nozzle unit along a path that extends at least partially along the rotational axis of the wire nozzle unit, and each of the rest of the wires is supplied to the wire nozzle unit along a corresponding path that is offset from the rotational axis of the wire nozzle unit; and the rotating of the wire nozzle unit includes winding each of the rest of the wires around a rotatable body synchronously with the rotation of the wire nozzle unit.

3. A method according to claim 1, wherein:

the winding of the wires further includes positioning the wire nozzles before the placing of the wires along the first one of the two slots such that the wire nozzles are arranged in a first direction, which is generally parallel to the axis of the armature core, and a first one of the wire nozzles leads the plurality of wire nozzles in the first direction;

the placing of the wires along the first one of the two slots includes moving the wire nozzle unit in the first direction to place the wires between the first end and the second end of the armature core along the first one of the two slots;

the rotating of the wire nozzle unit is performed when the wire nozzle unit is positioned beyond the second end of the armature core in the first direction, so that the first one of the wire nozzles leads the plurality of wire nozzles in a second direction, which is opposite to the first direction; and the placing of the wires along the second one of the two slots includes moving the wire nozzle unit in the second direction to place the wires between the second end and the first end of the armature core along the second one of the two slots.

4. A method according to claim 3, wherein:

the plurality of salient poles includes a plurality of sets of salient poles; and the winding of the wires further includes:

forming an extended section of the wires, which extends from the armature core, when the wires are wound around all of the salient poles in a first one of the plurality of sets of salient poles before winding the wires around each of the salient poles in a second one of the plurality of sets of salient poles; and unwinding each of the rest of the wires from the rotatable body such that twists are formed in the extended section of the wires.

5. A method according to claim 4, wherein:

the armature is for a multi-phase dynamo electric machine;

the salient poles in the first one of the plurality of sets of salient poles are of a first phase of the multi-phase dynamo electric machine; and the salient poles in the second one of the plurality of sets of salient poles are of a second phase of the multi-phase dynamo electric machine.

6. A method according to claim 3, wherein the rotatable body is rotatable relative to the wire nozzle unit.

7. A wire winding apparatus, which winds a plurality of wires simultaneously around each of a plurality of salient poles of an armature core, the wire winding apparatus comprising:

a wire nozzle unit, which is rotatable about a rotational axis of the wire nozzle unit, wherein the rotational axis of the wire nozzle unit is generally perpendicular to the axis of the armature core, and the wire nozzle unit includes a plurality of wire nozzles, each of which receives and guides a corresponding one of the wires along each of two slots, which are arranged on opposite sides, respectively, of each of the plurality of salient poles, to wind the wires around each of the plurality of salient poles; and a rotating means for rotating the wire nozzle unit about the rotational axis of the wire nozzle unit, wherein the rotating means is constructed to rotate the wire nozzle unit 180 degrees when the wire nozzle unit is moved from one of the two slots to the other of the two slots.

8. A wire winding apparatus according to claim 7, further comprising:

a plurality of bobbins, around each of which a corresponding one of the wires is wound;

a wire guiding means for guiding each of the wires to the wire nozzle unit from a corresponding one of the bobbins, wherein the wire guiding means guides at least one of the wires to the wire nozzle unit along a path that extends at least partially along the rotational axis of the wire nozzle unit, and the wire guiding means also guides each of the rest of the wires to the wire nozzle unit along a corresponding path that is offset from the rotational axis of the wire nozzle unit; and a rotatable body, around which each of the rest of the wires is wound when the wire nozzle unit is rotated by the rotating means, wherein the rotatable body is positioned between the bobbins and the wire nozzle unit and is rotatable relative to the wire nozzle unit.

* * * * *